March 18, 1969     H. D. ARNOLD     3,433,988
SLAB SIDE MOTOR WITH AN ASYMMETRICAL STARTING WINDING
Filed July 28, 1966     Sheet 1 of 2
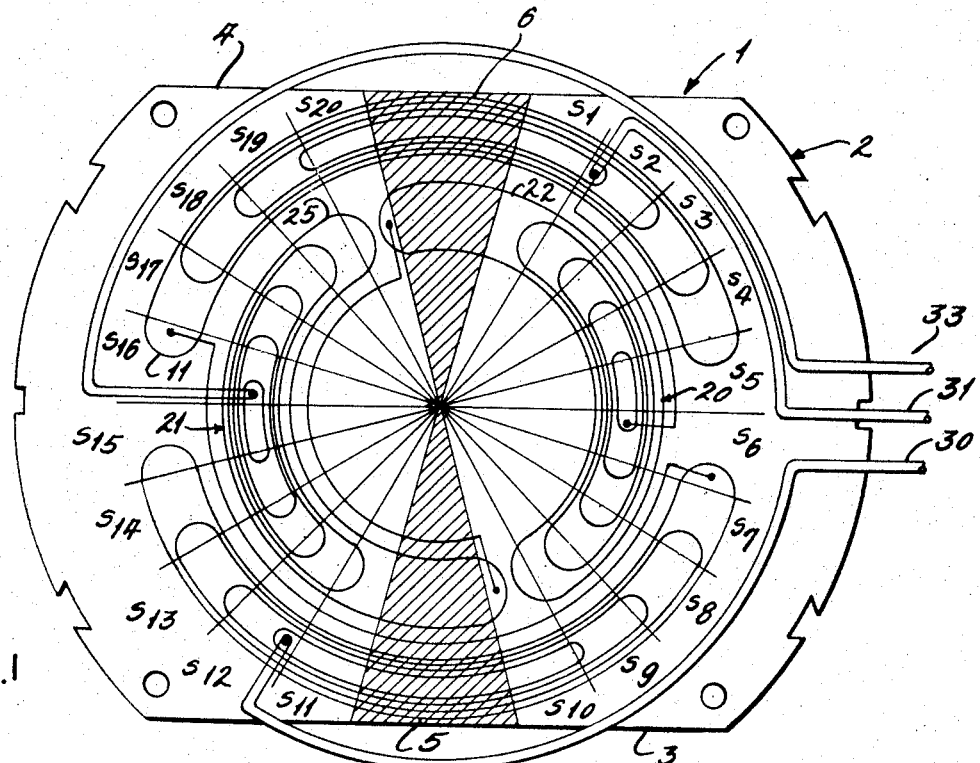
FIG.1
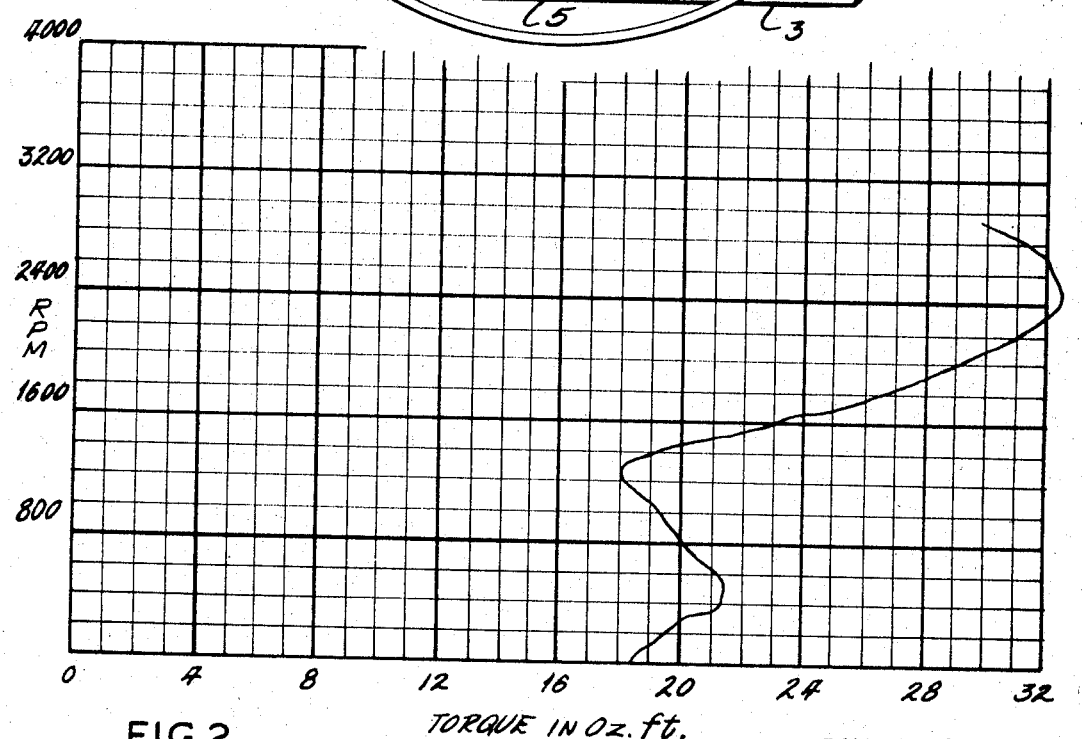
FIG.2    TORQUE IN Oz. ft.
INVENTOR:
HAROLD D. ARNOLD
BY
ATTORNEY United States Patent Office 3,433,988
Patented Mar. 18, 1969

3,433,988
SLAB SIDE MOTOR WITH AN ASYMMETRICAL STARTING WINDING
Harold D. Arnold, Bellefontaine Neighbors, Mo., assignor to Emerson Electric Co., St. Louis, Mo., a corporation of Missouri
Filed July 28, 1966, Ser. No. 568,477
U.S. Cl. 310—166
Int. Cl. H02k 17/04
5 Claims

ABSTRACT OF THE DISCLOSURE

In a single phase, unidirectional induction motor having a start winding and a main winding and means for initially energizing both windings and subsequently de-energizing the start winding, the motor having a stator with a substantially cylindrical bore defined by the inner faces of radially inwardly extending teeth defining between them winding-receiving slots, the stator having at least one slab side, the stator has at that part of its bore along the slab side, a wide tooth spanning at least one slot width so as to eliminate at least one slot from the regular course of slots, the main winding has a plurality of coil sets at least one of which has coils embracing the wide tooth symmetrically and the start winding has a plurality of coils inner ones of which are placed concentrically with respect to one another between successive sets of coils of the main winding and an outer one of which is asymmetrically arranged to embrace the wide tooth at one reach of the coil in the direction of rotation of the motor.

---

This invention relates to electric motors of the single phase induction type used on certain kinds of power tools in which a low shaft height is desirable, and to a stator winding arrangement for improving acceleration characteristics of such motors.

It is frequently desirable to provide a low shaft height in a power tool motor, to accommodate the tool. For example, a low shaft height permits a deeper cut for a circular saw blade of a given size. To provide such a low shaft height, a motor may be slabbed off on one side or on opposite sides, but it can be seen that such a slabbing off of the stator core reduces the yoke depth through the central span of the slabbed off part. Conventional winding practice applied to such motors produces third harmonic problems, leading to poor acceleration characteristics.

One of the objects of this invention is to provide a slabbed off single phase uni-directional induction motor, with a low shaft height, with acceptable acceleration characteristics.

Other objects will become apparent to those skilled in the art in the light of the following description and accompanying drawing.

In accordance with this invention, generally stated, in a single phase, uni-directional, induction motor having a start winding and a main winding and means for initially energizing both the windings and subsequently de-energizing the start winding when the motor has been started, the motor having a stator with a substantially cylindrical bore defined by the inner faces of radially inwardly extending teeth defining between them winding receiving slots, a stator is provided having at least one slab side along which is a wide tooth spanning at least one slot width so as to eliminate at least one slot from the regular course of slots. The main winding has coils embracing the wide tooth symmetrically and the start winding has a plurality of coils, inner ones of which are placed symmetrically concentrically with respect to one another and positioned between successive sets of the main winding and one outer coil of at least one set of the start winding is asymmetrically arranged to embrace the wide tooth at one reach of the coil in the direction of rotation of the motor.

In the preferred embodiment, the motor is a two-pole motor, with two wide teeth, the centers of which are substantially 180° apart, two sets of main winding coils are provided, each wound symmetrically about one of the wide teeth, and two sets of start winding coils are provided each having an asymmetrically wound outer coil with a greater reach at a wide tooth in the direction of rotation of the motor. In the specific example, the stator has twenty teeth, the wide teeth spanning the distance of two slots, slots numbers 1 and 10 being contiguous the two wide teeth on one side, and slots 20 and 11 being contiguous the wide teeth on the other side, the inner coils of the start windings being wound symmetrically about slots numbers 5 and 15 respectively, and the outer coils embracing 180°, and extending between slots 10 and 20 and 20 and 10 respectively.

In the drawing, FIGURE 1 is a view in end elevation of the stator of one illustrative embodiment of motor of this invention, the windings of the stator being shown diagrammatically, and teeth of the stator being symbolized by radially extending lines;

FIGURE 2 is a graph illustrating the acceleration characteristics of the illustrative example of the motor of this invention shown in FIGURE 1, in terms of torque in ounce feet against revolutions per minute;

Figure 4:
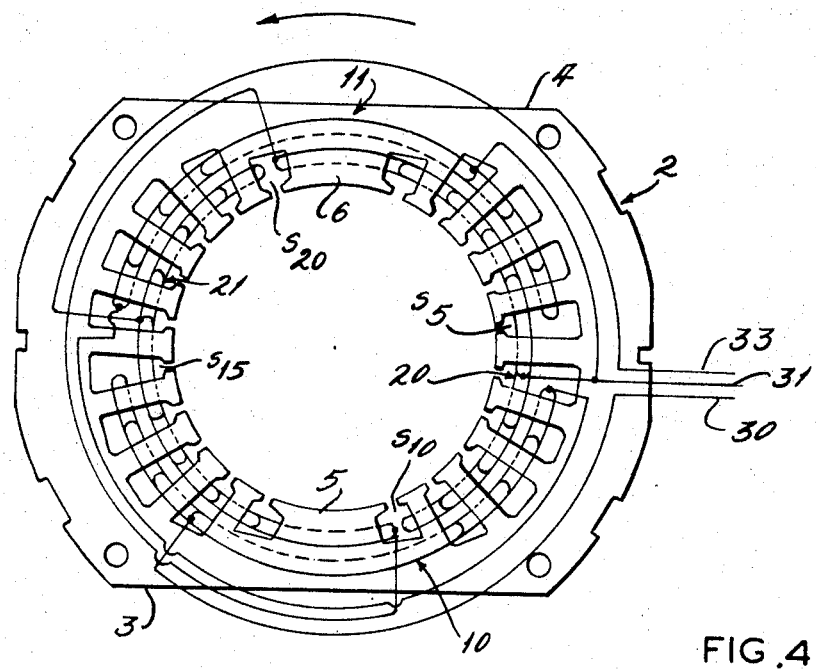
FIGURE 4 is a diagrammatic view showing windings superimposed on the lamination of FIGURE 3 to indicate their position in a stator made with such laminations.
Figure 3:
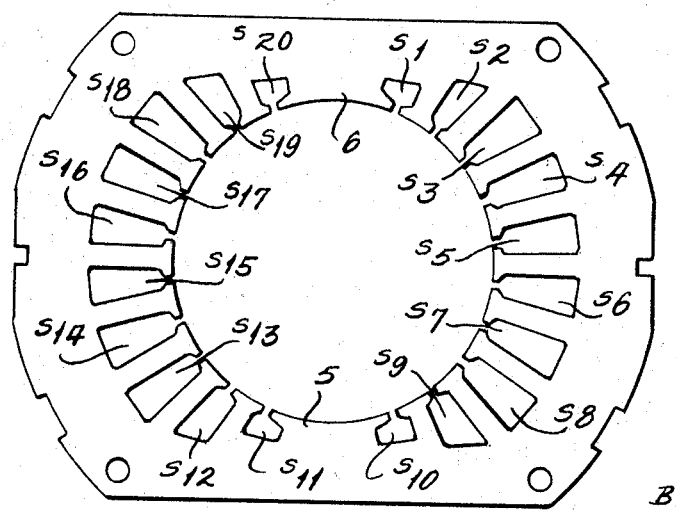
FIGURE 3 is a plan view of a lamination suitable for and illustrative of the configuration of a stator core of a motor of this invention.

Referring now to the drawing for one illustrative embodiment of this invention, reference numeral 1 indicates a single phase two-pole uni-directional motor. The motor 1 has a stator 2 and a conventional rotor, not here shown, as well as the usual end shields, also not here shown.

The stator 2 is slabbed off externally, to provide a lower flat 3 and an upper flat 4. The stator 2 has a cylindrical bore, defined by the radially inner ends of radially inwardly extending teeth, symbolized by radially extending lines in FIGURE 1. Between them, the teeth define slots S–1 through S–20.

In the center of the thinnest part of the yoke of the stator between the bottom flat 3 and the bore of the stator, is a wide tooth 5 the circumferential span of which is as great as three ordinary teeth and two slots. Similarly, between the upper flat 4 and the bore is a wide tooth 6, of the same size as the tooth 5. In this embodiment, the teeth 5 and 6 are symmetrical about a center line, and their center lines are 180° apart, i.e., the teeth 5 and 6 are diametrically opposite one another.

A main winding consists of sets 10 and 11, each of four concentric coils, connected in series. The main winding coil set 10 is wound symmetrically about the wide tooth 5, with its four coils having reaches in slots S–9 and S–12, S–8 and S–13, S–7 and S–14, and S–6 and S–15, respectively. The main coil set 11 has its four coils wound symmetrically about the wide tooth 6, with coils with reaches in slots S–2 and S–19, S–3 and S–18, S–4 and S–17 and S–5 and S–16, respectively.

A start winding consists of two sets of coils, 20 and 21, connected in series. In the illustrative embodiment shown, each of the coil sets 20 and 21 of the start winding has four inner coils, symmetrically wound with respect to one another, but asymmetrically positioned with respect to the main winding, and one outer coil which is asymmetrically wound with respect to the four inner coils as well as with respect to the main winding. The coil set 20 is wound symmetrically with respect to the slot 5, having coils with reaches in slots S–4 and S–6, S–3 and S–7, S–2 and S–8, and S–1 and S–9, respectively. An outer coil 22 of coil set 20 has reaches in slots S–10 and S–20, embracing the wide tooth 6, and extending substantially 180 mechanical degrees. The coil group 21 has four inner coils, having reaches in slots symmetrical about slot S–15, i.e. in slots S–14 and S–16, S–13 and S–17, S–12 and S–18, and S–11 and S–19 respectively. An outer coil 25 of the coil set 21 has reaches in slots S–20 and S–10.

The two main winding coil sets are each wound serially, with the last turn of the innermost coil leading to the first turn of the next coil of the set, and so on. The outermost coil of the coil set 10 is electrically connected to the outermost coil of the coil set 11. The innermost coil of the coil set 10 is electrically connected to one wire 30 of a two wire, single phase, 115 volt power system. The innermost coil of the coil set 11 is electrically connected to the other wire 31 of the two wire system.

The start winding coil sets 20 and 21 are wound in the same way, i.e. serially from the innermost coil to the outermost coil, and the extended reaches of the outermost coils of the two coil sets are electrically connected. The innermost coil of the coil set 21 is electrically connected to a conductor 33 which is connected, through a relay or centrifugal switch, in parallel to the same wire of the two wire system as the conductor 30. The innermost coil of the coil set 20 is electrically connected to the other wire 31, which is common to both the main and start windings.

The connections of the conductors 30, 31, and 33 are conventional, the conductor 33 being energized during the start, and disconnected from the source of power when the motor has been started.

The shifting of the outermost coils of the start winding, in the direction of rotation of the motor, in effect adds ampere turns to the main winding section. This addition, even though somewhat out of phase, does reduce the effect of the third harmonic which results when a normal, symmetrical start winding configuration is used. The improved acceleration characteristics of the motor of this invention are illustrated in FIGURE 2.

Having thus described the invention, what is claimed and desired to be secured by Letters Patent is:

1. In a single phase, unidirectional induction motor having a start winding and a main winding and means for initially energizing both said windings and subsequently de-energizing the start winding when the motor has been started, said motor having a stator with a substantially cylindrical bore defined by the inner faces of radially inwardly extending teeth defining between them winding-receiving slots, said stator having at least one slab side, the improvement comprising said stator's having at that part of its bore along said slab side, a wide tooth spanning at least one slot width so as to eliminate at least one slot from the regular course of slots, the main winding having a plurality of coil sets at least one of which has coils embracing said wide tooth symmetrically and the start winding having a plurality of coils, inner ones of which are placed concentrically with respect to one another between successive sets of said main winding and an outer one of at least one set of which is asymmetrically arranged to embrace the said wide tooth at one reach of the coil in the direction of rotation of the motor.

2. The improvement of claim 1 wherein the stator has a second wide tooth the center of which is substantially one hundred eighty mechanical degrees from the center of the first wide tooth, and each of two sets of start winding coils has an asymmetric outer coil with a greater reach at a wide tooth in the direction of rotation of the motor.

3. The improvement of claim 2 wherein the motor is a two pole motor and the wide tooth spans two slot widths.

4. The improvement of claim 2 wherein the stator has twenty slots, numbers one and ten of which are contiguous the two wide teeth on one side and numbers eleven and twenty of which are contiguous said wide teeth on the other side thereof, and the inner start winding coils of one set of the two sets are symmetrical about tooth number five and those of the other of the sets, about tooth number fifteen, and the outer coil of the first said set spans from slot number ten to slot number twenty and the outer coil of the second said set spans from slot number twenty to slot number ten.

5. The improvement of claim 3 wherein the outer coils of the start winding coil sets span substantially one hundred eighty mechanical degrees.

References Cited

UNITED STATES PATENTS

| Re. 26,179 | 3/1967 | Brammerlo | 310—185 |
| 2,795,712 | 6/1957 | Suhr | 310—166 |

ORIS L. RADER, *Primary Examiner.*

A. G. COLLINS, *Assistant Examiner.*